(12) United States Patent
Hermann et al.

(10) Patent No.: US 10,913,674 B2
(45) Date of Patent: Feb. 9, 2021

(54) APPARATUS FOR TREATING WATER

(71) Applicant: NEXUS EWATER PTY LTD, Fyshwich (AU)

(72) Inventors: Andrew James Hermann, Mawson (AU); Thomas Andrew Wood, Ainslie (AU)

(73) Assignee: NEXUS EWATER PTY LTD, Fyshwick (AU)

( * ) Notice: Subject to any disclaimer, the term of this patent is extended or adjusted under 35 U.S.C. 154(b) by 1015 days.

(21) Appl. No.: 15/508,009

(22) PCT Filed: Sep. 1, 2015

(86) PCT No.: PCT/AU2015/050513
§ 371 (c)(1),
(2) Date: Mar. 1, 2017

(87) PCT Pub. No.: WO2016/033648
PCT Pub. Date: Mar. 10, 2016

(65) Prior Publication Data
US 2017/0247277 A1 Aug. 31, 2017

(30) Foreign Application Priority Data
Sep. 2, 2014 (AU) .............................. 2014903501

(51) Int. Cl.
*C02F 1/24* (2006.01)
*C02F 9/00* (2006.01)
(Continued)

(52) U.S. Cl.
CPC ............ *C02F 9/00* (2013.01); *B01D 19/0042* (2013.01); *B01D 19/02* (2013.01);
(Continued)

(58) Field of Classification Search
CPC ....... B01D 19/02; B01D 19/0042; C02F 1/24; C02F 9/00; C02F 1/283; C02F 2101/301;
(Continued)

(56) References Cited

U.S. PATENT DOCUMENTS 4,834,872 A   5/1989   Overath
5,776,335 A * 7/1998   Overath ................. B01D 24/12
                                            210/167.21

(Continued)

FOREIGN PATENT DOCUMENTS

WO   WO 2008/101276 A1   8/2008
WO   WO 2011/160185 A1   12/2011

OTHER PUBLICATIONS

International Search Report from the Australian Patent Office for International Application No. PCT/AU2015/050513, dated Nov. 16, 2015.

(Continued)

*Primary Examiner* — Thomas M Lithgow
(74) *Attorney, Agent, or Firm* — Finnegan, Henderson, Farabow, Garrett & Dunner

(57) ABSTRACT

An apparatus (12) for treating water, in particular for removing surfactants from waste water, includes a vessel (14), defining an inlet (16) for receiving waste water containing air bubbles, and an outlet (20) for the exit of water, following treatment. Inside the vessel there is at least one tubular member (50) having a lower open end (52) into which the flow of waste water from the inlet may be directed in use. The tubular member (50) extends from the inlet towards a top of the vessel where an upper exit (54) from the tubular member is defined. In use, most un-aerated water entering the vessel through the inlet can exit the tubular member at the lower open end. Foam formed in the water by the air bubbles may travel up the tubular member to the upper exit, (Continued)

which is preferably located above the water level (60) in the vessel.

12 Claims, 4 Drawing Sheets

(51) Int. Cl.
*B01D 19/02* (2006.01)
*B03D 1/14* (2006.01)
*B03D 1/02* (2006.01)
*B03D 1/24* (2006.01)
*B01D 19/00* (2006.01)
*B01F 3/04* (2006.01)
*B01F 5/04* (2006.01)
*C02F 1/28* (2006.01)
*C02F 1/78* (2006.01)
*C02F 101/30* (2006.01)
*C02F 103/00* (2006.01)
*C02F 1/20* (2006.01)
*C02F 1/32* (2006.01)

(52) U.S. Cl.
CPC ........ *B01F 3/04446* (2013.01); *B01F 5/0413* (2013.01); *B03D 1/02* (2013.01); *B03D 1/1412* (2013.01); *B03D 1/24* (2013.01); *C02F 1/24* (2013.01); *B01F 2003/04865* (2013.01); *B01F 2215/0052* (2013.01); *C02F 1/20* (2013.01); *C02F 1/283* (2013.01); *C02F 1/32* (2013.01); *C02F 1/78* (2013.01); *C02F 2101/301* (2013.01); *C02F 2103/002* (2013.01); *C02F 2303/02* (2013.01)

(58) Field of Classification Search
CPC .. C02F 2103/002; C02F 2303/02; C02F 1/20; C02F 1/32; B01F 3/04446; B01F 5/0413; B01F 2003/04865; B01F 2215/0052; B03D 1/1412; B03D 1/02; B03D 1/24
USPC .............................................. 210/703, 221.2
See application file for complete search history.

(56) References Cited

U.S. PATENT DOCUMENTS

| | | |
|---|---|---|
| 6,156,209 A | 12/2000 | Kim |
| 6,436,295 B2 | 8/2002 | Kim |
| 6,732,675 B1 * | 5/2004 | Liao ...................... A01K 63/04 119/259 |
| 6,808,625 B1 | 10/2004 | Wu |
| 7,624,969 B2 | 12/2009 | Schletz et al. |

OTHER PUBLICATIONS

Written Opinion of the International Searching Authority from the Australian Patent Office for International Application No. PCT/AU2015/050513, dated Nov. 16, 2015.

* cited by examiner

APPARATUS FOR TREATING WATER

CROSS-REFERENCE TO RELATED APPLICATIONS

This application claims priority from Australian provisional patent application No 2014903501 filed on 2 Sep. 2014 and entitled "Apparatus for treating water", the entire contents of which are hereby incorporated by reference.

TECHNICAL FIELD

This invention relates to an apparatus for treating water, particularly grey water.

BACKGROUND

In many countries and regions, fresh water is either already a limited resource, or is becoming a limited resource.

In domestic environments, water is used for drinking, washing, sanitation (e.g. for showers and flushing toilets) and for irrigation. The water comes from many different sources including reservoirs, rainwater tanks, wells, rivers, lakes, and streams. In many countries, water is supplied through centralised municipal systems in which the water is extensively treated so as to be potable/suitable for drinking. As the existing water resources fail to meet demand, other sources of water such as sea water and treated sewage are increasingly being used to meet the gap.

Since less than 2% of the municipal water supplied is actually used for drinking, potable water supplies could be saved by use of lower quality water for irrigation and flushing toilets in particular, and possibly also for laundry uses. These needs could be met by either rainwater or using treated waste water.

While there are some centralised facilities for the treatment of water, it is expensive to transport, treat and return water from such large centralised facilities to the end user. It would be more efficient, at least in terms of transport costs, to treat the water locally at the same site where it is to be used.

The largest portion of domestic waste water by volume is produced by the washing of people and their clothes, and this waste water is commonly called "grey water". If this grey water were kept separate from the much more heavily contaminated toilet and kitchen waste (commonly known as "black water") it should be possible to cost-effectively clean the water to a quality sufficient for flushing toilets, car washing, garden irrigation and possibly laundry uses, which in many households account for at least 50% of water use, potentially reducing water usage for a typical domestic residence by half.

A number of systems for treating grey water have been proposed. Note also that different jurisdictions have different regulations concerning the use of grey water and rainwater for irrigation and flushing toilets. What is permitted in one jurisdiction may not be permitted in another. Some basic systems simply coarsely filter the grey water and use it for subsurface irrigation. Since the water still contains infectious agents it may not come into contact with people or their food. The filters may become clogged with hair and other detritus and can become covered in bacterial growth so present a health hazard, as well as failing to maximise the re-use potential of the grey water.

More complex systems filter and then sanitise the grey water, often using chlorine, ozone or ultraviolet light. While this water may be suitable for flushing toilets, it still contains organic material which results in bacterial growth, and again the re-use potential of the water is not maximised.

Systems have been described which treat the grey water to remove the organic material as well as the particulate material and infectious agents. For example PCT/AU2008/000213 describes a combination of flocculation with aluminium sulphate, sanitation with calcium hypochlorite and filtration to treat laundry waste to a high standard. While systems such as these produce water which is suitable for toilet flushing and irrigation, and do not expose the user to infectious agents, they require regular addition of chemicals and periodic replacement of filters. This increases the cost of operation and makes the system less user friendly as it requires regular attention.

WO 2011/160185 to the same applicant as the present application, the entire contents of which are incorporated by reference, describes an improved process and apparatus for purifying water. The process comprises collecting waste water containing surfactants and including grey water for local re-use, injecting air into the waste water to form bubbles in the waste water, separating the bubbles, and any entrained contaminants, from the waste water, drying the separated bubbles and returning any water recovered from the dried bubbles to the waste water undergoing treatment, and collecting the waste water. The invention has the advantage that the process is robust and mechanically simple that does not require regular replacement of chemicals or filters, but can be used for treating waste water locally, e.g. in a domestic residence. The process is carried out in an apparatus which includes a bubble separator. The present invention is concerned with improvements to the apparatus/bubble separator disclosed in WO 2011/160185.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

In a first broad aspect the present invention provides an apparatus for treating water, in particular for removing surfactants from waste water, comprising:

a vessel, defining an inlet for receiving waste water containing air bubbles, and an outlet for the exit of water, following treatment; and at least one tubular member having a lower open end into which the flow of waste water from the inlet may be directed in use, the tubular member extending from the inlet towards a top of the vessel where an upper exit from the tubular member is defined, wherein, in use, most un-aerated water entering the vessel through the inlet can exit the tubular member at the lower open end, and foam formed in the water by the air bubbles may travel up the tubular member to the upper exit, which is preferably located above the water level in the vessel, in use.

Advantageously the tubular members enhance the separation of the foam from the water streams and guide the flow of foam to the top of the vessel where it can be gently dropped onto the water/foam surface. Separation is improved since most un-aerated water entering the vessel through the inlet can exit the tubular member at the lower open end.

In use, the waste water is recirculated through the system multiple times during which time contaminants are gradually attached to the foam and removed. Typically, the water will be re-circulated for 40-60 minutes, and on average each molecule of water will pass through the system about 50 times.

In a preferred embodiment, the tubular member includes a plurality of turns so as to define a serpentine path for the transport of fluids through the tubular member. Typically a first turn/bend at 45° aligns the flow for a subsequent series of one or more 90° turns/bends.

The bends provide good contact between the remaining air and water streams and enhance the separation of the water from the foam and encourage any air bubbles in the water to form foam. In particular, the bends provide a gentle turbulent flow which allows for the contaminants to adhere to the bubbles. The bends reduce the velocity of the water as it enters the tubular member, but also allows the bubbles to continue their natural vertical path, which allows the contaminants to be attracted to the bubbles without being violently disrupted.

In a preferred embodiment, the tubular member defines a further aperture positioned along its length between the serpentine path and the upper exit, for the egress of un-aerated water from the tubular member.

Typically the tubular member includes a junction (such as a "T-junction") where it joins an generally upwardly extending tubular portion at an angle, with the lower end of the upwardly extending tubular portion defining the further aperture pointing generally towards the base of the vessel.

The T-junction and downwardly facing aperture allow any remaining un-aerated water to escape and directs the water towards the base of the vessel. In use, the further aperture is below the water surface so that the water does not disturb the foam formed above the water surface.

It is preferred that the tubular member defines a generally horizontally extending portion in which the upper exit of the tubular member is defined and that the horizontally extending portion extends generally tangentially to the exterior of the vessel, which is typically cylindrical and generally circular in plan, so that the exit deposits foam generally tangentially to the exterior to induce rotation in the vessel.

Typically, the vessel will contain a plurality of tubular members such as two, three, or four or more. The members will be arranged so that they all deposit the foam tangentially to encourage rotation of the foam in the same direction to form an annular vortex.

Preferably the horizontal portion of the tubular member is undercut at the exit, typically at an angle of 45° to the horizontal.

Typically the inlet is defined at or adjacent the base of the vessel and comprises an inlet tube having a smaller diameter than that of the tubular member, and whose end is located inside the tubular member.

Typically the outlet for the exit of waste water is defined in the base of the vessel.

Advantageously, the tubular member enhances the separation of air from the water stream maintaining an undisturbed surface for foam to form and contaminants to concentrate. More foam is produced and the foam is deposited more gently onto the water surface or onto existing foam floating on that surface. The above advantages result in improved stability of the water-foam interface.

In a further advantageous feature, the use of the tubular members allows the overall height of the vessel to be reduced and the vessel made more compact.

It is also envisaged that tubular members may be retrofitted to existing bubble separators. Thus according to a further aspect of the present invention, there is provided a tubular member for use in an apparatus for treating water, the tubular member defining:

an inlet or first open end into which a flow of waste water may be directed in use;

a main outlet at a second end distal from the inlet;

a serpentine portion having at least one bend, and preferably a plurality of bends which extends away from the inlet;

a junction portion where the tubular member defines a change in direction and a further aperture or outlet;

wherein the main exit of the tubular member is defined in a portion of the tubular member which extends generally perpendicularly to the serpentine portion.

Typically, the junction portion comprises a tubular portion intersecting a second tubular portion at an angle with one end of the second tubular portion defining the further aperture/outlet.

In one preferred embodiment, the tubular member defines an initial short straight tubular portion, a series of bends typically a first bend through about 45° followed by three or more bends through about 90°, which serpentine portion intersects a further tubular portion at an angle, typically 45°, one end of the further tubular portion defining the further aperture, the further tubular portion turning through 90° and whose end defines the main outlet.

The present invention also encompasses a method of treating waste water using an apparatus according to the first aspect of the invention.

More particularly there is provided a method for treating water, in particular for removing surfactants from waste water, using an apparatus comprising:

a vessel, defining an inlet for receiving waste water, and an outlet for the exit of water, following treatment; and at least one tubular member having a lower open end into which the flow of waste water from the inlet may be directed in use, the tubular member extending from the inlet towards a top of the vessel where an upper exit from the tubular member is defined;

the method comprising:

injecting air into the waste water, using a venturi or the like, to create aerated water and directing the aerated water to the inlet wherein, in use, any un-aerated water entering the vessel through the inlet tends to exit the tubular member at the lower open end, and foam formed in the water by the air bubbles travels up the tubular member to the upper exit, which, in use, is located above the water level in the vessel;

recirculating water from the outlet via the venturi to inject more air into the water and passing the aerated water back into the vessel via the inlet for a period of time; and allowing foam to exit the vessel via the upper exit.

The water cleaning system is typically used in the treatment of grey water, including household grey water. "Grey water" is waste water that arises from plumbing fixtures not designed to receive human excrement or discharges and is thus not grossly contaminated with faeces or urine. Grey water might also include waste water generated by commercial vehicle washes, including car or bus washes, commercial laundries, and the like.

Grey water contains variable quantities of inorganics (e.g. dissolved salts such as phosphates, nitrates etc.) organics (e.g. oils, greases, soaps, toothpaste, shampoo/conditioner, hair dyes, surfactants and cleaning chemicals) physical impurities (e.g. dirt, food sand, lint, hair, blood, urine, faeces etc.) and micro-organisms (e.g. bacteria, viruses, protozoa etc.) which arise from personal and personal hygiene practices.

BRIEF DESCRIPTION OF DRAWINGS

Specific embodiments of the invention will now be described, by way of example only, and with reference to the accompanying drawings in which.

DESCRIPTION OF EMBODIMENTS

Figure 1:
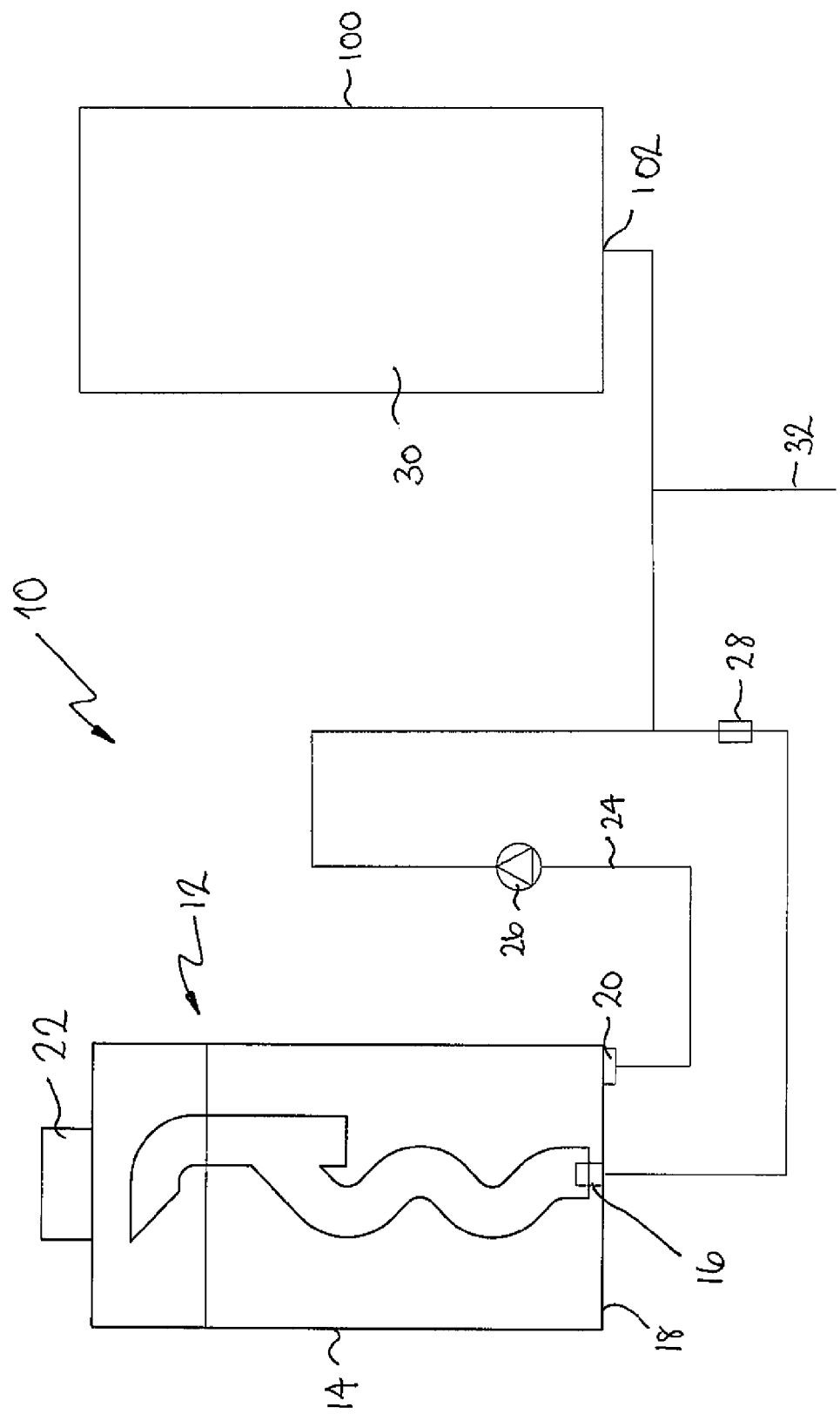
FIG. 1 is a schematic drawing illustrating elements of a system for treating grey water.

Referring to the drawings, FIG. 1 is a schematic view of a water treatment system 10 which includes an apparatus for removing surfactants from the water, also referred to as a "bubble separator" 12. The bubble separator 12 includes a vessel 14 which is the form of an upright generally cylindrical tank which has a water inlet 16 in its base 18 and an outlet 20, also in its base 18. There is an exit/outtake for foam 22 at the top of the tank. The tank is connected by tubing 24 to a recirculation loop including a pump 26 and a venturi air intake 28 and to a carbon filter 30, as well as a water exit from the system 32.

Figure 2:
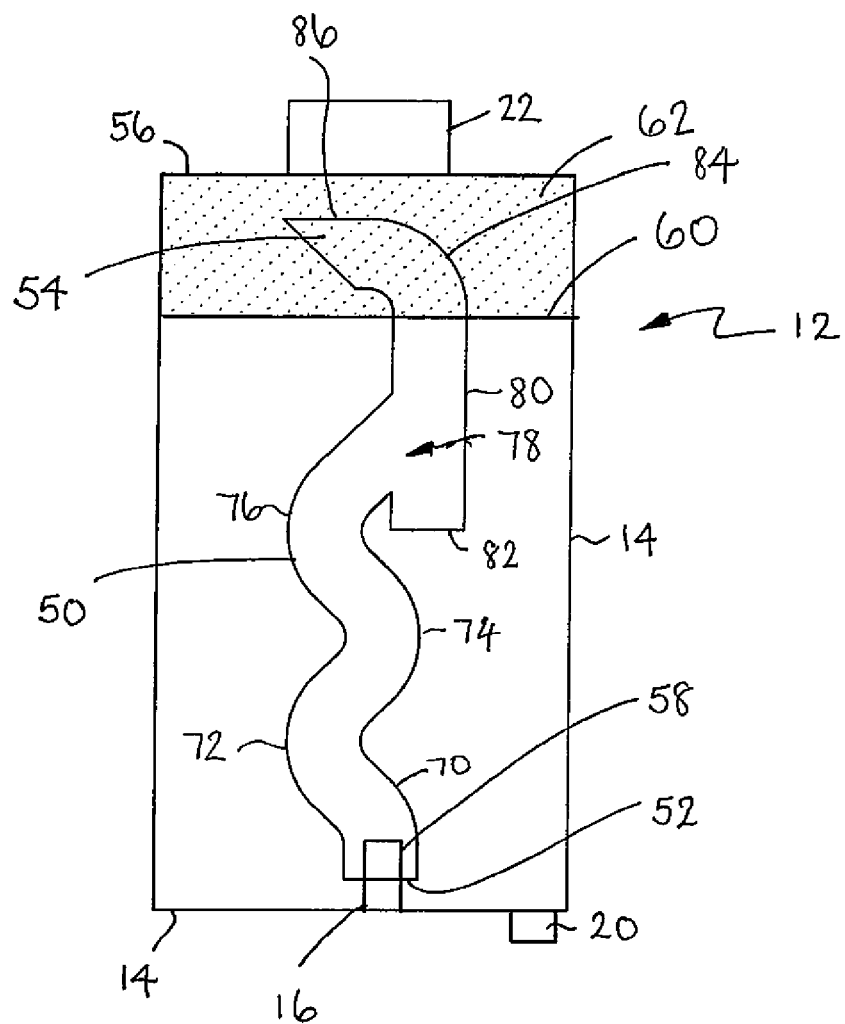
FIG. 2 is a schematic view of a bubble separator of the system.

FIG. 2 shows the bubble separator 12 only, which includes a single tubular member 50 having a generally annular cross-section which extends from one lower open end 52 near the base 14 of the vessel to another open end 54 near the top 56 of the vessel. As can be seen in FIG. 2, the water inlet 16 is in the form of a short tube 58 which projects into the interior of the vessel and also a small distance inside the lower open end of the tubular member 50. The inlet tube typically has a smaller diameter than the tubular member of about 15 mm compared to the tubular member which has a diameter of about 50 mm. FIG. 2 also shows the typical water level 60 of the vessel, in use, above which foam 62 is present, the water level also defining a water/foam interface.

Figure 3:
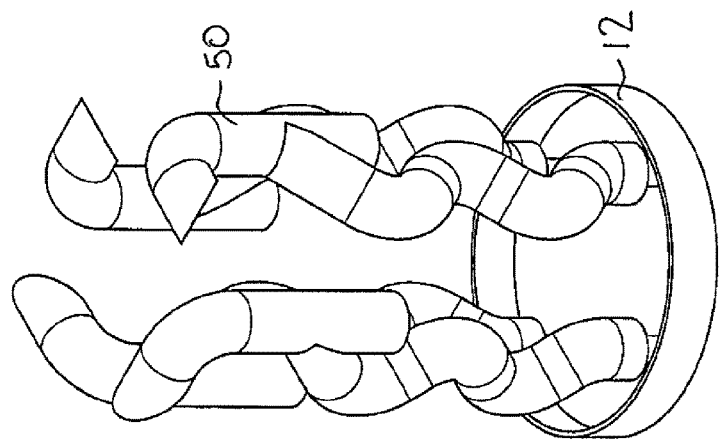
FIG. 3 is an isometric view illustrating the arrangement of four tubular members in a vessel of the system shown in FIGS. 1 and 2.
Figure 4:
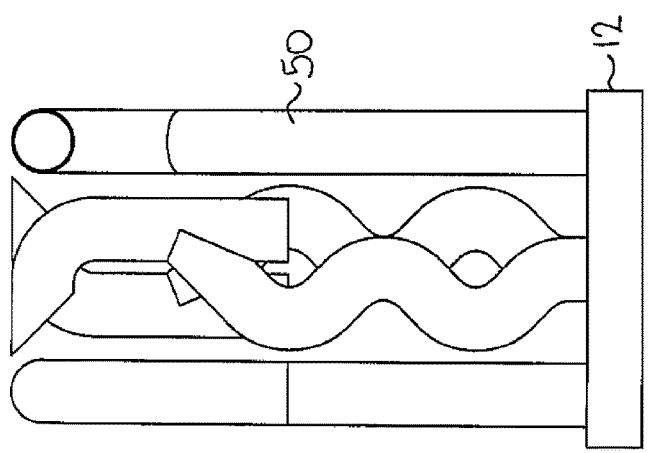
FIG. 4 is a side view of the arrangement shown in FIG. 3.
Figure 5:
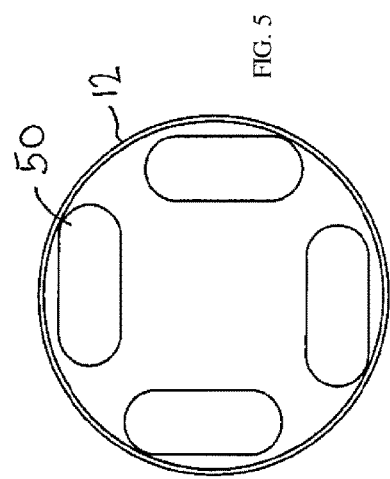
FIG. 5 is a top plan view of the arrangement shown in FIG. 3.
Figure 7:
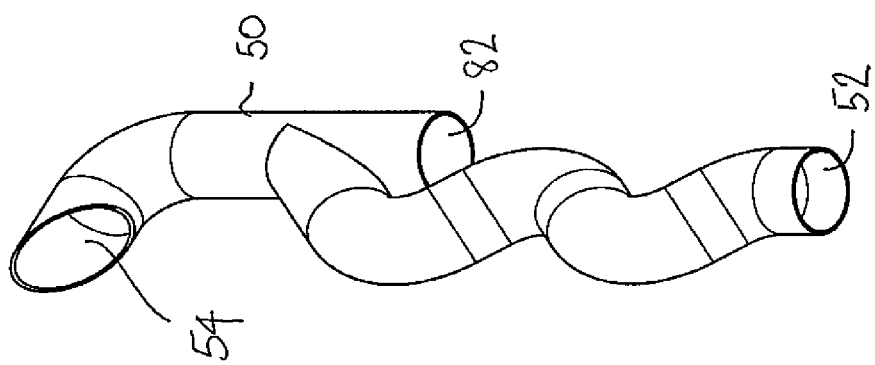
FIG. 7 is a perspective view of the tubular member shown in FIG. 6.
Figure 6:
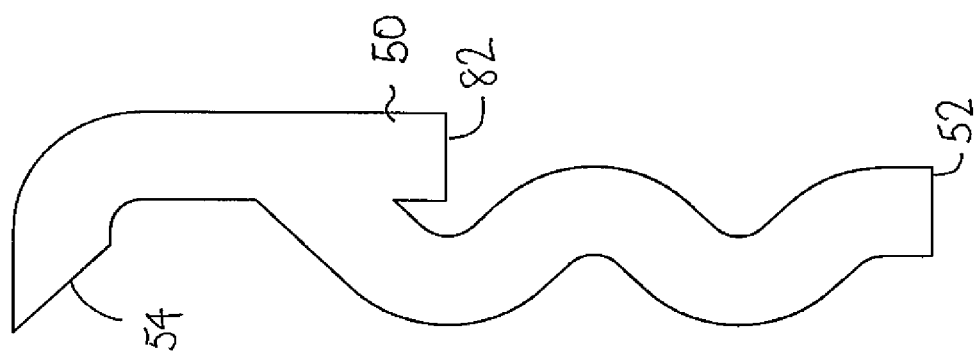
FIG. 6 is a side view of a tubular member of the type shown in FIG. 3.

As shown in FIG. 2, the tubular member 50 defines a serpentine path along which fluid may travel upwards through the vessel. (The tubular member 50 is also shown separate from the vessel in FIGS. 6 and 7). In particular the tubular member defines a 45° turn/bend 70 before defining three consecutive 90° turns/bends, 72, 74, and 76. After the last 90° turn, the tubular member defines a junction 78 where the tubing joins with a cross-piece 80 at an angle of 45°. The cross-piece 80 is aligned to extend vertically upwards. The lower end 82 of the crosspiece extends a short distance below the junction and is open. The vertical cross-piece extends a short distance before the tubular member turns through a final 90° bend 84. That is followed by a short horizontal portion 86, before reaching the outlet 54 of the tubular member which is cut at a plane which is 45° to the vertical FIGS. 3 to 5 show a preferred arrangement of four tubular members 50 in the vessel. The side walls and top of the vessel are omitted in order to show the tubular members in more detail, each of which is the same as the tubular member shown in FIG. 2. In particular, with reference to FIG. 5, it can be seen that the tubular members are arranged around the edges of the tank in an annulus/plane which is generally perpendicular to the radius of the tank (i.e. tangentially), as is the exit for the foam at the top of the tubular member so that any foam leaving the exit 54 is gently encouraged to flow in a circular path around the vessel on top of the water surface.

In use, grey water passes into the system and is aerated with the venturi 28 which vigorously introduces large quantities of air into the grey water before the water enters the vessel 14. The volume of water and air can be adjusted for optimum operation of the system depending on various parameters, but typically the flow rate of water into the system may be in the order of 30 litres per minute and air may be injected at a rate of between 3 and 20 litres per minute, e.g. 10 litres per minute. Ozone is preferably also injected into the water in low concentrations to improve system performance and oxidise malodourous compounds. The aerated water enters the vessel at the base of the vessel via the inlet tube which ends inside the tubular member near its open lower end.

The air entering the waste water forms bubbles which are then sheared into smaller bubbles preferably by the use of a static mixer (not shown). The surfaces of these bubbles become coated in a mono layer of detergent molecules arranged so that their hydrophobic portions generally face the air inside the bubble and their hydrophilic portions face the body of the water. Organic material and particulate in the grey water also adsorb onto the surface of those bubbles.

The mixture of waste water and air then enters the bubble separator 12 via the narrow inlet tube 58 into the lower portion of the tubular member 50 which has a much greater cross-sectional area. Because the inlet tube 58 is considerably narrower than the tubular member, the velocity of the water will drop as it enters the tubular member 50 and most of the un-aerated water, which is denser than the aerated water, will tend to escape under gravity though the opening at the lower end of the tubular member.

The flow of aerated water then turns through about 45° before passing through three 90° turns forming a serpentine path. These bends provide good contact between the remaining air and water streams and encourage water to separate and any air bubbles to form foam. The flow then passes to the "T-junction" which provides the downward facing exit located below the water/foam interface. This allows any water which has separated from the foam to escape under gravity as it is denser than the foam. The foam continues to travel up the tubular member along the vertical section before passing though the final 90° bend along a horizontal portion of the tubular member and though the outlet. The 45° cut on the outlet 54 encourages gentle deposition of the foam onto the foam/water surface. As the layer of foam 62 on top of the water level 60 grows in height it will eventually exit via the foam outtake 22. The foam layer is mostly "dry" as most of the water drains out of the foam as it rises through the tubular members 50. The foam which exits the bubble separator gradually collapses and can be fed to the sewer using a small amount of carried over water.

During this time the water is continuously circulated in a loop into the vessel 14 and out through the outlet 20 to the venturi where air is injected into it at the desired rate before being injected back into the vessel. Foam exits the vessel from the exit 22 at a volume rate generally equal to the rate that air is injected into the water flow by the venturi. After a period of time the process is stopped. Although there will be some foam still floating on top of the water which has not been forced through the exit 22, the amount will be insignificant.

The treated water is then pumped out of the vessel 14 into a tank 100 containing a carbon filter 30 for final removal of particulates via an inlet 102. The water exits the tank after a predetermined period via the same inlet/outlet 102 at the base of the tank. The filtered water may then be further treated using a UV lamp and then stored in a tank for use (e.g. for flushing toilets, garden irrigation or the like).

Although the FIGS. 3 to 5 show a bubble separator having four tubes, it will be appreciated that the chamber may include fewer tubes, for example embodiments which include one two or three tubes are envisaged as well as embodiments having more than four tubes. Also the number of bends in the chimney may vary from that shown in the drawings.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The claims defining the invention are as follows:

1. An apparatus for treating water, in particular for removing surfactants from waste water, comprising:
    a vessel, defining an inlet for receiving waste water containing air bubbles, and an outlet for the exit of water, following treatment; and
    at least one tubular member located in the vessel having a lower open end which receives from the water flowing in the vessel inlet, the tubular member extending from the inlet towards a top of the vessel where an upper exit from the tubular member is defined, wherein, in use, most un-aerated water entering the vessel through the inlet can exit the tubular member at the lower open end, and foam formed in the water by the air bubbles may travel up the tubular member to the upper exit, which, in use, is preferably located above the water level in the vessel wherein the tubular member includes a plurality of turns so as to define a serpentine path for the transport of fluids through the tubular member.

2. An apparatus for treating water as claimed in claim 1, wherein the serpentine path includes at least three turns.

3. An apparatus for treating water as claimed in claim 1 wherein the tubular member defines a further aperture positioned along its length between a serpentine path and the upper exit, for the egress of un-aerated water from the tubular member.

4. An apparatus as claimed in claim 3 wherein the tubular member includes a junction where it joins an generally upwardly extending tubular portion at an angle, with the lower end of the upwardly extending tubular portion defining the further aperture.

5. An apparatus as claimed in claim 1 wherein the tubular member defines a generally horizontally extending portion in which the exit of the tubular member is defined and wherein the horizontally extending portion extends generally tangentially to the exterior of the vessel so that the exit deposits foam generally tangentially to the exterior of the vessel to induce rotation in the vessel.

6. An apparatus as claimed in claim 5 wherein the generally horizontally extending portion of the tubular member is undercut at the exit, at an angle of about 45° to the horizontal.

7. An apparatus as claimed in claim 1 wherein the vessel includes a base and the inlet is defined at or adjacent the base of the vessel and comprises an inlet tube having a smaller diameter than that of the tubular member, and whose end is located inside the tubular member.

8. An apparatus as claimed in claim 1 wherein the vessel includes a base and the outlet for the exit of waste water is defined in the base of the vessel.

9. A tubular member for use in an apparatus for treating water, the tubular member defining:
    an inlet or first open end into which a flow of waste water may be directed in use;
    a main outlet at a second end distal from the inlet;
    a serpentine portion having a plurality of bends, which extends away from the inlet;
    a junction portion where the tubular member defines a change in direction and a further aperture or outlet;
    wherein the main outlet of the tubular member is defined in a portion of the tubular member which extends generally perpendicularly to the serpentine portion.

10. A tubular member as claimed in claim 9 wherein the junction portion comprises a tubular portion intersecting a second tubular portion at an angle with one end of the second tubular portion defining the further aperture/outlet.

11. A tubular member as claimed in claim 9 wherein the tubular member defines an initial short straight tubular portion, a series of bends typically a first bend through about 45° followed by three or more bends through about 90°, which serpentine portion intersects a further tubular portion at an angle, one end of the further tubular portion defining the further aperture, the further tubular portion turning through 90° the main outlet being defined at the end of the further tubular portion.

12. A method for treating water, in particular for removing surfactants from waste water, using an apparatus comprising:
    a vessel, defining an inlet for receiving waste water, an outlet for the exit of water, following treatment, and an upper outlet for foam; and
    at least one tubular member having a lower open end into which the flow of waste water from the inlet may be directed in use, the tubular member including a plurality of turns so as to define a serpentine path for the transport of fluids through the tubular member and extending from the inlet towards a top of the vessel where an upper exit from the tubular member is defined;
    the method comprising:
    injecting air into the waste water, using a venturi, to create aerated water and directing the aerated water to the inlet wherein, un-aerated water entering the vessel through the inlet exits the tubular member at the lower open end, and foam formed in the water by the air bubbles travels up the tubular member to the upper exit of the tubular member, which, is located above the water level in the vessel;
    recirculating water from the outlet via the venturi to inject more air into the water and passing the aerated water back into the vessel via the inlet for a period of time; and allowing foam to exit the vessel via the upper outlet of the vessel.

\* \* \* \* \*